July 29, 1952  W. T. EPPLER  2,604,659
FEEDING APPARATUS FOR PLASTIC EXTRUDERS
Filed July 1, 1950  3 Sheets-Sheet 3
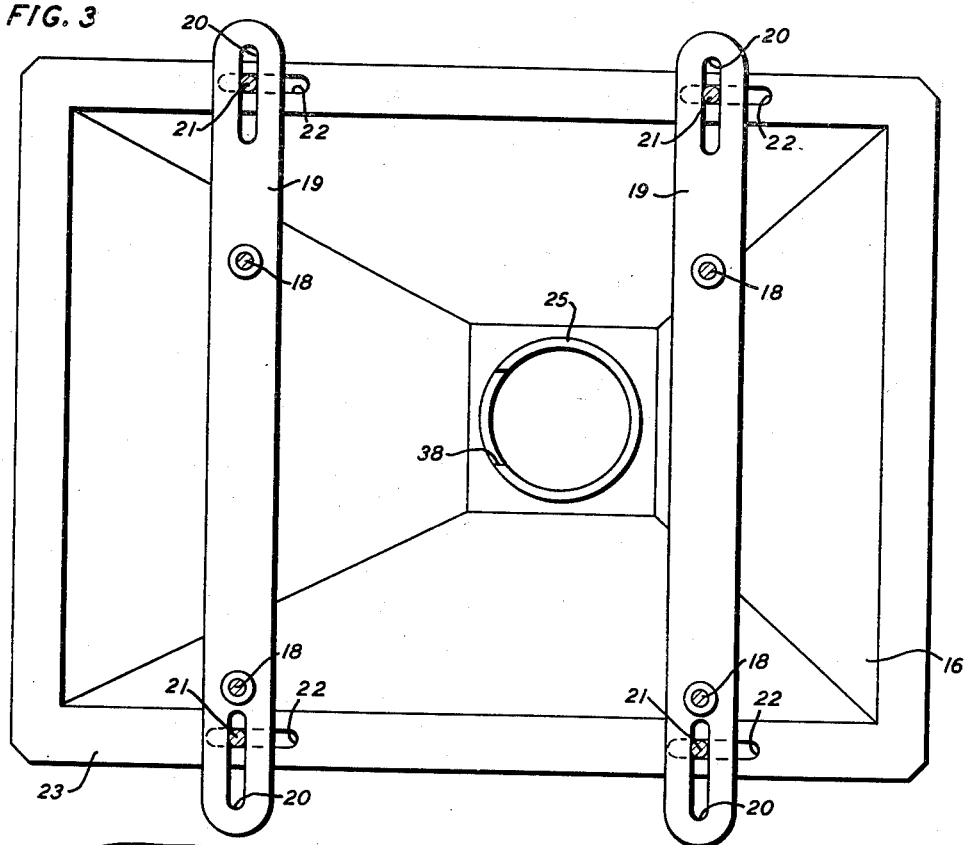
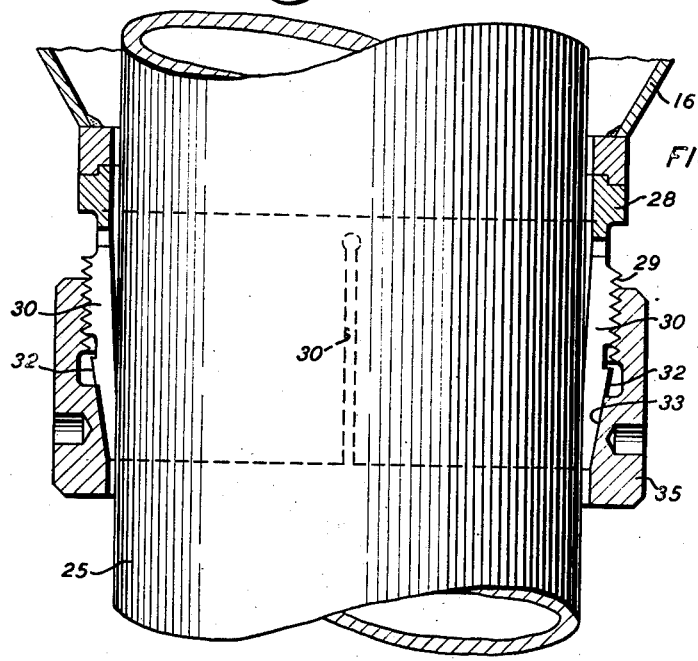
INVENTOR
W. T. EPPLER
BY
ATTORNEY Patented July 29, 1952

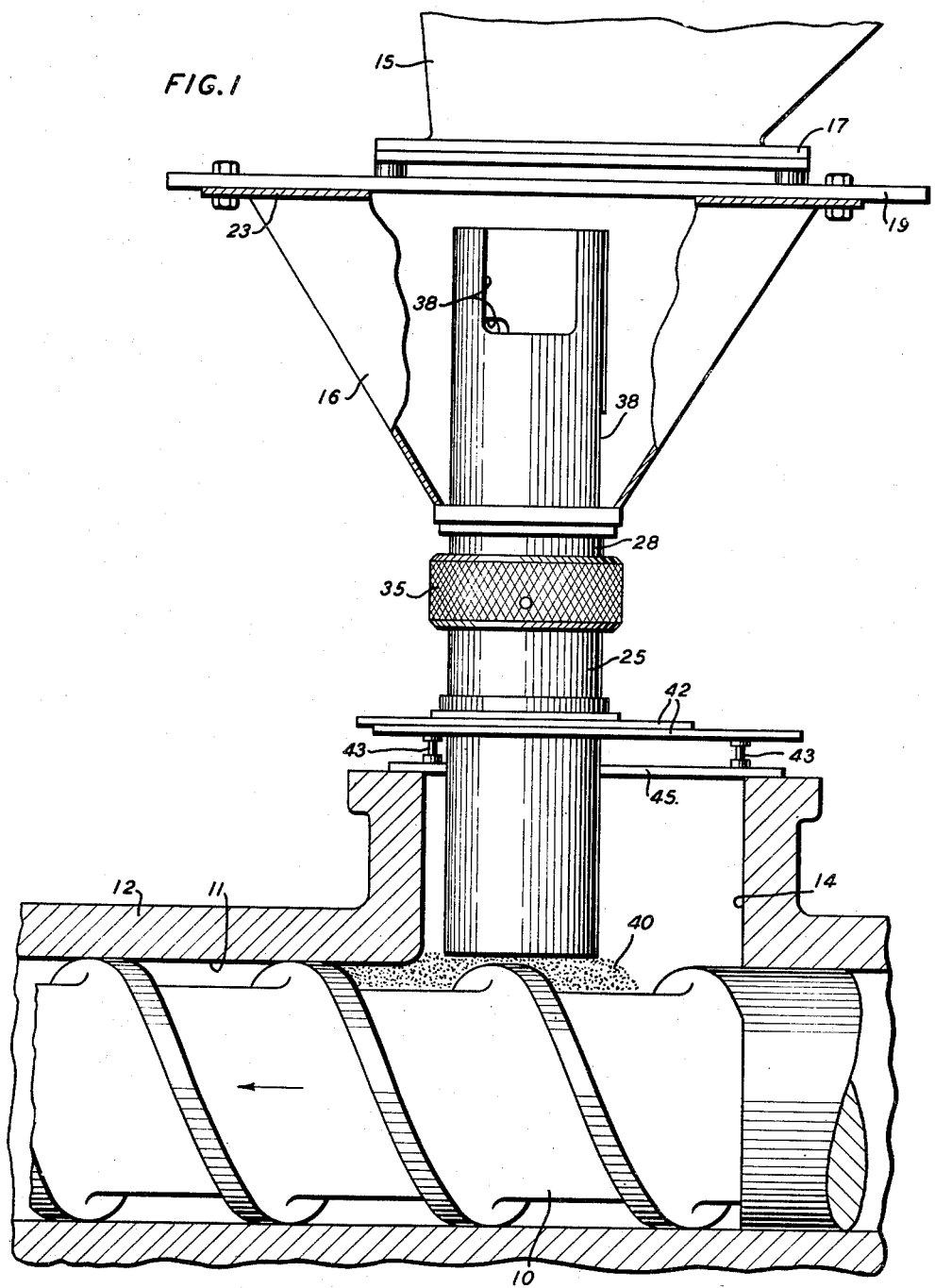

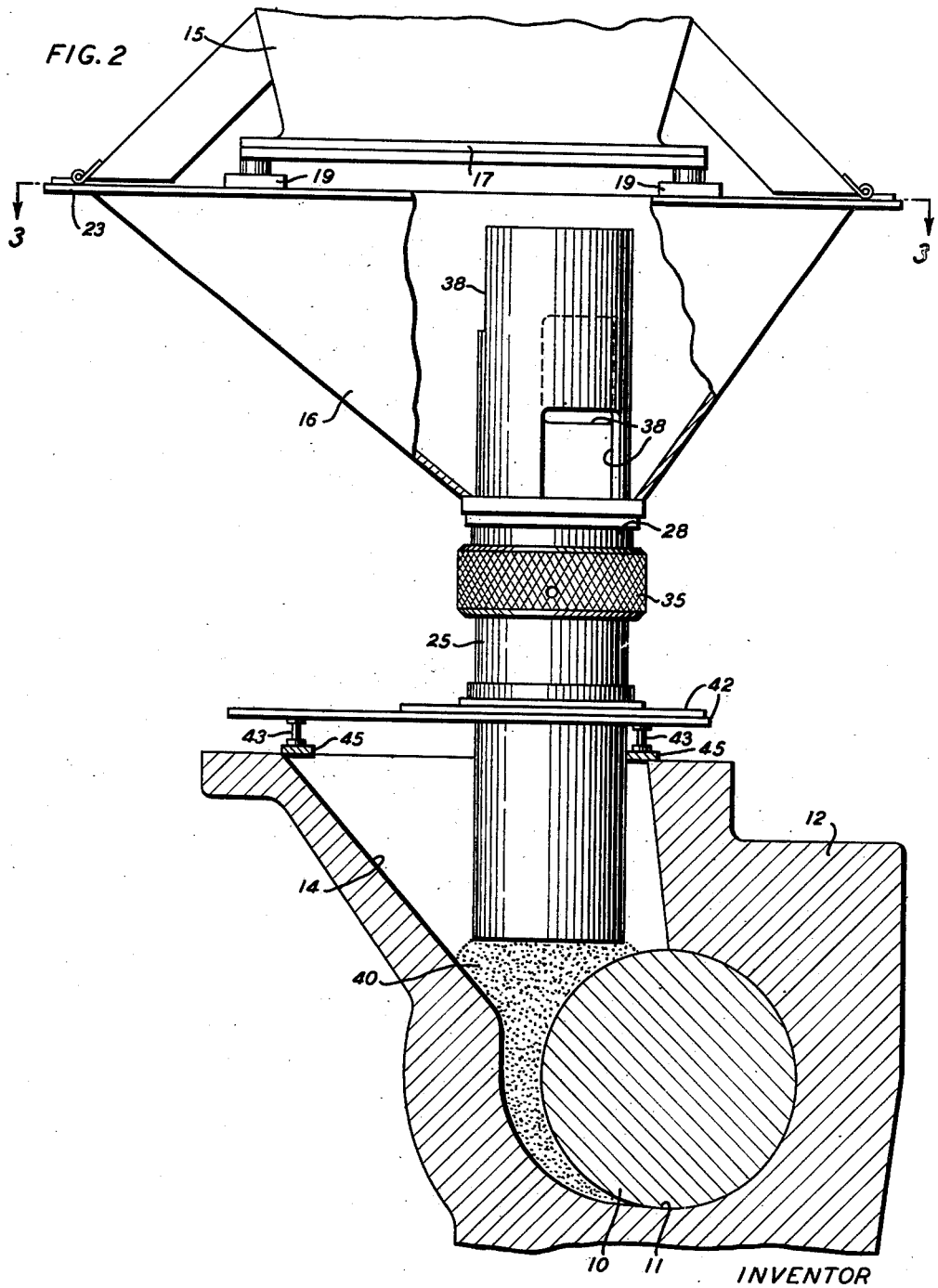

UNITED STATES PATENT OFFICE 2,604,659

FEEDING APPARATUS FOR PLASTIC EXTRUDERS

Walter T. Eppler, Cranford, N. J., assignor to Western Electric Company, Incorporated, New York, N. Y., a corporation of New York Application July 1, 1950, Serial No. 171,676

2 Claims. (Cl. 18—12)

This invention relates to feeding apparatus for plastic extruders, particularly those for extruding plastic sheaths on cable cores.

In conventional plastic extruders a feed screw rotates in a housing to transport the plastic material from an inlet to the extrusion nozzle, the housing being heated to a given temperature to convert the plastic material from its original diced or granular state into a fused mass for extrusion on a cable core. In the present embodiment of the invention, the plastic material is polyethylene cut into small cubes and in some instances a given number of the cubes remain connected in stick-like formation.

The conventional gravity feed hoppers are mounted on the housing with their outlets in alignment with the inlet of the housing so that the material may feed downwardly by gravity to the screw. However, the gravity feed is frequently blocked by the formation of mechanical and fused bridges or arches in the hopper and inlet, resulting in a loss of the sheath being applied to the cable core. The fused bridges resulted from the regurgitation of a semi-fused plastic mass with each revolution of the screw. These masses move to a position slightly above the screw and occasionally remain long enough to be joined by a second and still further masses. When these bridge-like structures begin to form they accumulate additional heat from each regurgitation until finally sufficient heat is accumulated to fuse the granules into a solid bridge, sealing off the gravity feed.

The mechanical bridge which occasionally forms in the lower portion of the conventional hopper consists of an arch of granules or cubes resulting from the interlocking or the correct alignment of the cubes to form an arch.

An object of the present invention is to provide a feeding apparatus for plastic extruders which is simple in structure but highly efficient in assuring an uninterrupted path for the constant feeding of plastic material to a feed screw of a plastic extruder.

With this and other objects in view, the invention comprises a feeding apparatus for a plastic extruder having the conventional screw to feed particles of plastic material through a heated housing where the material is fused before it reaches the nozzle. The salient features of the invention include a hopper for the material spaced from the heated housing and a feed tube for directing the material from the hopper into the housing to a position adjacent the screw.

By positioning of the hopper and the feed tube out of contact with the heated housing a cool receptacle and path for the material to the screw is provided and any possible formation of fused bridges to interrupt the feeding process is eliminated. Furthermore, by extending the feed tube vertically a given distance into the hopper and providing apertures throughout the upper portion thereof to receive the particles of the material, any formation of the particles which might tend to form a mechanical bridge structure is interrupted by the feed tube with its open end and apertures.

Other objects and advantages will be apparent from the following detailed description when considered in conjunction with the accompanying drawings, wherein Fig. 1 is a fragmentary vertical sectional view of the apparatus mounted on a plastic extruder;

Fig. 2 is a side elevational view of the structure shown in Fig. 1, portions thereof being broken away;

Fig. 3 is a lateral sectional view taken along the line 3—3 of Fig. 2; and

Fig. 4 is an enlarged fragmentary detailed view of the clamping means for the feed tube.

Referring now to the drawings, attention is first directed to Figs. 1 and 2 which illustrate a feed screw 10 rotating counterclockwise (Fig. 2) in a passageway 11 of a housing 12 having an inlet 14 to receive the plastic material. The screw 10 is driven in a conventional manner to feed the material to an extrusion nozzle (not shown) and the housing 12 is heated in the usual manner to fuse the material from its granular or cube cut original condition into an extrudable mass to form a sheath on the cable core (not shown).

The invention includes a main hopper 15 rigidly supported in a frame (not shown) and having its lower end opening into an auxiliary hopper 16. In the present embodiment of the invention, the flanged lower end 17 of the main hopper 15 is secured by bolts or the like 18 to lateral members 19 which have elongate apertures 20 adjacent their outer ends. Bolts 21, extending through the elongate apertures 20 and similar but transversely positioned elongate apertures 22 in the top flange 23 of the auxiliary hopper 16, provide an adjustable connecting means between the two hoppers whereby the auxiliary hopper and its feed tube 25 may be adjusted relative to the inlet 14 of the housing 12 and also relative to the outlet end of the main hopper 15. The lower or outlet end of the auxiliary hopper 16 has a threaded collar 28 mounted therein, the collar being externally threaded at 29 and provided with notches 30 to produce resilient gripping portions. The lower ends of the gripping portions have tapered surfaces 32 to be engaged by similarly tapered inner surfaces 33 of a nut 35 whereby the gripping portions will be forced inwardly to firmly grip the feed tube 25 when the nut is tightened on the collar 28.

The feed tube 25 may be formed of suitable material preferably transparent material such as Lucite so that the operator may observe continuous advancement of the material from the hoppers into the extruder. The upper portion of the feed tube extending into the auxiliary hopper 16 has three large apertures 38 disposed spirally in a given formation so that for the entire length of the feed tube in the auxiliary hopper and for substantially the entire circumference thereof, an opening or aperture will be present to receive the material 40. The lower end of the feed tube extends to a position closely adjacent the screw 10, this position being variable through the structure shown in Fig. 4.

A guarding structure 42 surrounds the feed tube 25 and extends over the inlet 14. This structure is supported at spaced positions by relatively small elements 43 to assure against transmission of heat from the housing to the feed tube and to allow heat to escape from the inlet 14 away from the feed tube and the auxiliary housing.

During operation of the plastic extruder, the material initially fed to the main hopper 15 to maintain the auxiliary hopper 16 filled will be directed through the feed tube into the inlet 14 to a position closely adjacent the screw. By providing a cooled passageway to a point beyond where it was formerly possible for fused bridges to form, the feed tube intersects the regurgitated masses to thereby assure against formation of fused bridges within the inlet. Furthermore, the granular material entering the housing is kept from the heated walls thereof delaying fusing of the material until it is moved beyond the inlet and into the main passageway 11. Furthermore, by surrounding of the cool material with the tube to keep it from being heated by the housing, the heat in the inlet will be allowed to escape with the gases and air as the material is taken into the housing.

The presence of the apertures 38 in the upper portion of the feed tube, the upper aperture extending through the upper end of the tube and the lower aperture extending beneath the outlet end of the auxiliary hopper 16, together with their spiral arrangement about the circumference of the feed tube assures against possible formation of mechanical bridges within the auxiliary hopper. The main hopper is of sufficient size including the outlet end to avoid the formation of the mechanical bridges therein. If it is desirable to vary the position of the outlet end of the feed tube 25 with the screw 10, this may be accomplished by loosening the nut 35 to free the feed tube for movement to the desired position after which the nut 35 may be tightened to hold the feed tube in the position selected. Similar adjustments may be made between the auxiliary hopper including the feed tube and the main hopper through the adjustment of the bolts 21 in their elongate apertures 20 and 22. The elements 43 may be secured to the guard 42 and act as supporting legs resting on an annular member 45.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A feeding apparatus for a plastic extruder having an extrusion bore, a screw to feed particles of plastic material through the bore, a heated housing for the screw, to fuse the material passing through the bore, having an aperture for the material adjacent the receiving end of the screw, the apparatus comprising a hopper for the material spaced from the housing, a feed tube having its upper opened end extending a given distance into the hopper and having spaced apertures throughout the said upper end to receive the particles from the hopper, the lower end of the feed tube extending into the aperture of the housing to a position adjacent the screw to feed the particles of material directly to the screw, and means to secure the tube to the hopper.

2. A feeding apparatus for a plastic extruder having an extrusion bore, a screw to feed particles of plastic material through the bore, a heated housing for the screw, to fuse the material passing through the bore, having an aperture for the material adjacent the receiving end of the screw, the apparatus comprising a main supply hopper for the material having an outlet lower end, an auxiliary hopper substantially inverted truncated cone shaped with its upper end larger than the outlet lower end of the main hopper and mounted thereon to receive the material therefrom, a transparent feed tube having its upper end extending a given distance into the auxiliary hopper and having an open end and spaced spirally positioned apertures throughout the said upper end to receive the particles and eliminate the bridging of the particles in the auxiliary hopper, the lower end of the tube extending into the aperture of the housing free of the housing to a position adjacent the screw whereby the particles will be maintained relatively cool as compared to the temperature of the housing to eliminate the formation of fused bridges of the particles in the aperture of the housing.

WALTER T. EPPLER.

REFERENCES CITED

The following references are of record in the file of this patent:

UNITED STATES PATENTS

| Number | Name | Date |
|---|---|---|
| 2,369,359 | MacWilliam et al. | Feb. 13, 1945 |
| 2,446,057 | Morin | July 27, 1948 |